United States Patent
Khetan et al.

(10) Patent No.: US 8,013,696 B2
(45) Date of Patent: Sep. 6, 2011

(54) MAGNETIC APPARATUS AND METHOD OF MANUFACTURING THE MAGNETIC APPARATUS

(75) Inventors: Raghunath P. Khetan, Troy, MI (US); Mohammad S. Islam, Saginaw, MI (US); Matt Mielke, Freeland, MI (US); Brian J. Magnus, Frankenmuth, MI (US); Tomy Sebastian, Saginaw, MI (US); Charmaine Wittig, Saginaw, MI (US); William D. Glumm, Bay City, MI (US); Joe Koscielecki, Bay City, MI (US)

(73) Assignee: Nexteer (Beijing) Technology Co., Ltd.

( * ) Notice: Subject to any disclaimer, the term of this patent is extended or adjusted under 35 U.S.C. 154(b) by 45 days.

(21) Appl. No.: 12/251,143

(22) Filed: Oct. 14, 2008

(65) Prior Publication Data

US 2010/0089686 A1    Apr. 15, 2010

(51) Int. Cl.
*H01F 1/00*    (2006.01)
(52) U.S. Cl. .................... 335/209; 335/302; 180/417
(58) Field of Classification Search .......... 335/302–306, 335/209; 180/417–294
See application file for complete search history.

(56) References Cited

U.S. PATENT DOCUMENTS

| | | | |
|---|---|---|---|
| 528,635 A | 11/1894 | Holt | |
| 2,475,450 A | 7/1949 | Dvorak | |
| 2,479,363 A | 8/1949 | Jewell | |
| 2,695,370 A | 11/1954 | Brouwer | |
| 3,126,617 A | 3/1964 | Blume | |
| 3,299,819 A | 1/1967 | McCoy | |
| 3,619,677 A | 11/1971 | Hargreaves | |
| 3,945,568 A | 3/1976 | Bychowski | |
| 4,225,250 A | 9/1980 | Wagner et al. | |
| 4,267,427 A | 5/1981 | Nomura et al. | |
| 4,555,685 A | 11/1985 | Maruyama | |
| 4,600,555 A | 7/1986 | Shimizu | |
| 4,835,505 A | 5/1989 | Hattori et al. | |
| 4,920,316 A | 4/1990 | Egloff | |
| 5,038,066 A | 8/1991 | Pawlak et al. | |
| 5,047,882 A | 9/1991 | Kawai et al. | |
| 5,070,956 A | 12/1991 | Pawlak et al. | |
| 5,111,098 A | 5/1992 | Peck et al. | |
| 5,119,898 A | 6/1992 | Eckhardt et al. | |
| 5,182,848 A | 2/1993 | Wheeler | |
| 5,297,994 A | 3/1994 | Suzuki et al. | |
| 5,299,754 A | 4/1994 | Lackowski | |

(Continued)

FOREIGN PATENT DOCUMENTS

JP    54068911 A    6/1979

(Continued)

*Primary Examiner* — Anh T Mai
*Assistant Examiner* — Bernard Rojas
(74) *Attorney, Agent, or Firm* — Cantor Colburn LLP (57) ABSTRACT

The present invention provides for a magnetic apparatus and a method of manufacturing the magnetic apparatus including a magnet having an outer surface and an inner surface opposing each other with the inner surface having a first portion and a second portion integrally connected to and facing each other and utilizing a fluid and a fixture body defining a hole along a fixture axis and a deflector disposed within the hole. The method includes the steps of installing the magnet on the fixture body and securing the magnet to the fixture body. The method further includes the steps of flowing the fluid through the magnet transverse to the fixture axis to form at least one aperture and intersecting the fluid with the deflector to redirect the fluid generally along the fixture axis.

21 Claims, 4 Drawing Sheets

U.S. PATENT DOCUMENTS

| | | | |
|---|---|---|---|
| 5,445,240 A | 8/1995 | Cunningham et al. | |
| 5,506,557 A | 4/1996 | Sakaguchi et al. | |
| 5,655,621 A * | 8/1997 | Birsching | 180/428 |
| 5,668,519 A | 9/1997 | Yamashita | |
| 5,691,682 A | 11/1997 | Jeffers et al. | |
| 5,826,885 A | 10/1998 | Helgeland | |
| 5,831,364 A | 11/1998 | Buse | |
| 6,198,372 B1 | 3/2001 | Schwarz | |
| 6,199,867 B1 | 3/2001 | Mahoney et al. | |
| 6,259,343 B1 * | 7/2001 | Schwarz | 335/302 |
| 6,692,676 B1 | 2/2004 | Vig et al. | |
| 6,717,324 B2 | 4/2004 | Chen | |
| 6,791,797 B2 | 9/2004 | Saito et al. | |
| 7,102,477 B2 | 9/2006 | Bland et al. | |
| 7,325,434 B2 | 2/2008 | Esaki et al. | |
| 2003/0230948 A1 | 12/2003 | Murakami et al. | |

FOREIGN PATENT DOCUMENTS

| | | |
|---|---|---|
| JP | 56010058 A | 2/1981 |
| JP | 57148567 A | 9/1982 |
| JP | 61046150 A | 3/1986 |
| JP | 01151215 A | 6/1989 |
| JP | 02310816 A | 12/1990 |
| JP | 03024701 A | 2/1991 |
| JP | 04123749 A | 4/1992 |
| JP | 04259373 A | 9/1992 |
| JP | 07335430 A | 12/1995 |
| JP | 10058484 A | 3/1998 |
| JP | 10149915 A | 6/1998 |
| JP | 2001076948 A | 3/2001 |
| JP | 2001091376 A | 4/2001 |
| JP | 2001118737 A | 4/2001 |
| JP | WO 02071424 A1 | 9/2002 |
| JP | 2005081413 A | 3/2005 |
| JP | 2005151734 A | 6/2005 |
| JP | 2006329770 A | 12/2006 |
| JP | 2007082334 A | 3/2007 |
| JP | 2007167935 A | 7/2007 |

* cited by examiner

MAGNETIC APPARATUS AND METHOD OF MANUFACTURING THE MAGNETIC APPARATUS

BACKGROUND OF THE INVENTION

1. Field of the Invention

The present invention relates to a magnetic apparatus and a method of manufacturing the magnetic apparatus.

2. Description of the Prior Art

One application where a magnetic apparatus may be used is in vehicles equipped with a power steering assembly, such as the power steering assembly disclosed in U.S. Pat. No. 5,445,240 to Cunningham, et al. The power steering assembly includes a stub shaft and a retaining hub mounted to the stub shaft. The magnetic apparatus includes a magnet attached to the retaining hub and with the magnet defining a longitudinal axis. The magnet includes an outer surface and an inner surface opposing each other. The magnet further includes a first end wall and a second end wall adjacent the inner and outer surfaces. The first end wall defines a plurality of v-shaped notches extending axially relative to the longitudinal axis with the inner surface of the magnet includes a lip proximal to the v-shaped notches.

A method of manufacturing the magnetic apparatus includes forming the magnet with the v-shaped notches disposed in the first end wall. Grinding or machining of the inner surface of the magnet is required to form the lip on the inner surface. It is difficult to grind or machine features into the magnet because the magnet is very brittle and susceptible to cracking and damage. Thus it would be beneficial to eliminate the lip on the inner surface because forming the lip is expensive for production.

The retaining hub is formed by injection molding plastic in a mold cavity and when the plastic cures, the first end wall of the magnet is attached to the retaining hub. More specifically, plastic is disposed in the v-shaped notches and around the lip to attach the magnet to the retaining hub. The plastic shrinks around the lip and in the v-shaped notches to eliminate clearance between the magnet and the retaining hub.

Therefore, there remains a need to develop a magnetic apparatus and method of manufacturing the magnetic apparatus that eliminates the lip of the prior art design.

SUMMARY OF THE INVENTION AND ADVANTAGES

The present invention provides for a method of manufacturing a magnetic apparatus including a magnet having an outer surface and an inner surface opposing each other with the inner surface having a first portion and a second portion integrally connected to and facing each other and utilizing a fluid and a fixture body defining a hole along a fixture axis and a deflector disposed within the hole. The method includes the steps of installing the magnet on the fixture body and securing the magnet to the fixture body. The method further includes the steps of flowing the fluid through the magnet transverse to the fixture axis to form at least one aperture and intersecting the fluid with the deflector to redirect the fluid generally along the fixture axis.

The present invention also provides for a magnetic apparatus including a retaining hub and a magnet attached to the retaining hub. The magnet defines a longitudinal axis and includes an outer surface and an inner surface opposing each other with the inner surface having a first portion and a second portion integrally connected to each other with the first portion facing the second portion in a spaced relationship relative to the longitudinal axis. The magnet defines at least one aperture disposed through the inner and outer surfaces transverse to the longitudinal axis with a section of the retaining hub disposed in the aperture for attaching the retaining hub to the magnet such that the retaining hub and the magnet rotate in unison about the longitudinal axis.

The present invention therefore provides for a magnet having at least one aperture extending through an inner surface and an outer surface transverse to a longitudinal axis with a section of the retaining hub disposed in the aperture for attaching a retaining hub to the magnet. The aperture eliminates the need to create a lip as required in the prior art design as discussed above while maintaining an adequate attachment between the magnet and the retaining hub. Further, the aperture and the section of the retaining hub disposed in the aperture provides radial and axial retention between the magnet and the retaining hub thus ensuring adequate attachment between the magnet and the retaining hub. In addition, the method of forming the aperture through the magnet reduces production costs of the magnet while also reducing the risk of cracking or damaging the magnet during the forming process.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 1:
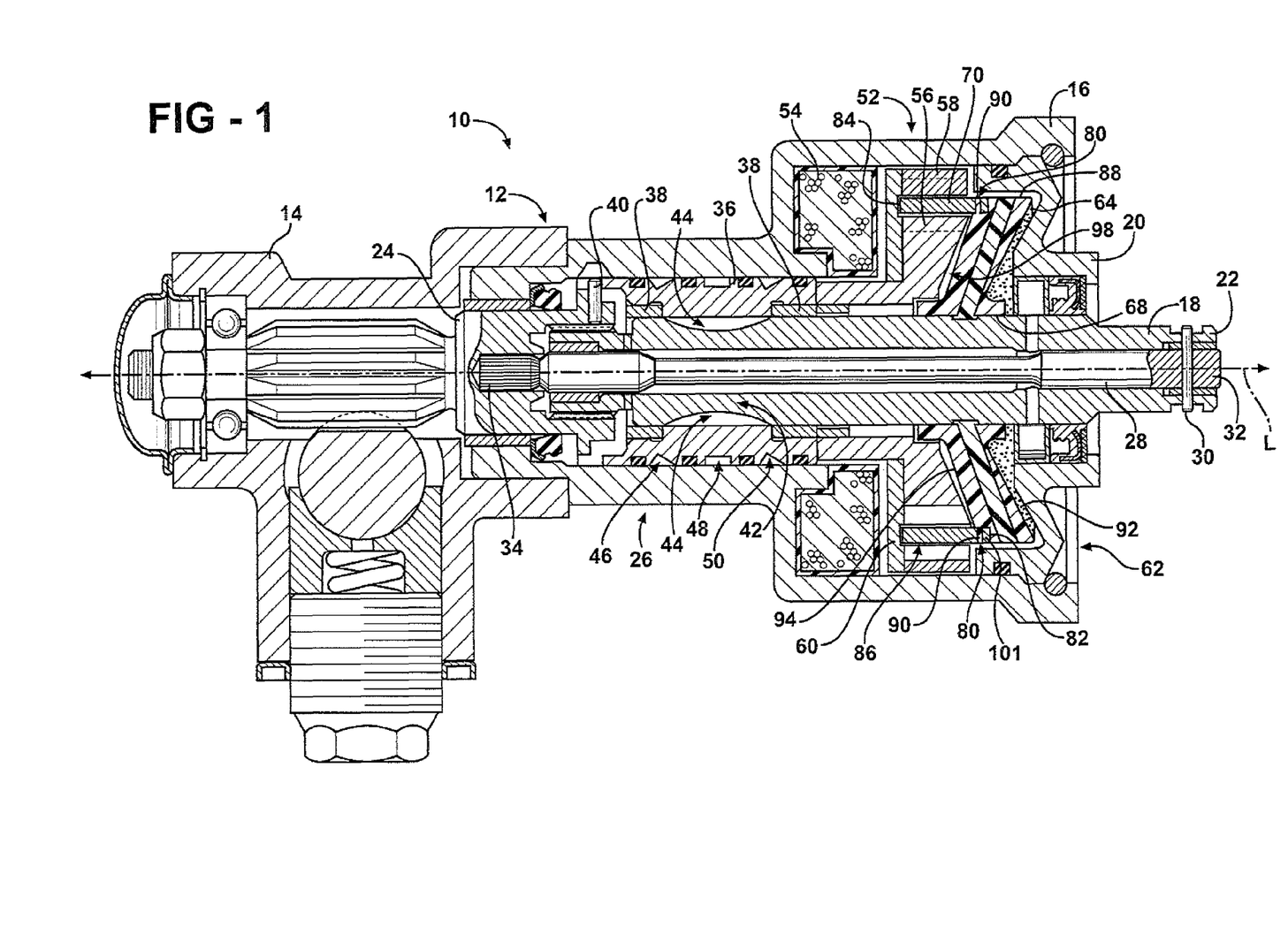
FIG. 1 is a partial cross-sectional view of a power steering assembly.

Referring to the Figures, wherein like numerals indicate like or corresponding parts throughout the several views, a power steering assembly 10 for a vehicle (not shown) is generally shown in FIG. 1.

The power steering assembly 10 includes a composite housing 12 having a rack housing 14 and a valve housing 16 coupled to each other. The power steering assembly 10 also includes a stub shaft 18 protruding into the valve housing 16 through a cover 20 on the valve housing 16. A steering wheel (not shown) is coupled to an outboard end 22 of the stub shaft 18 such that the steering wheel and stub shaft 18 rotate in unison. A pinion head 24 is supported by and rotatable in the rack housing 14.

The power steering assembly 10 includes a proportional control valve 26 having a torsion bar 28 disposed in the stub shaft 18 with a first pin 30 rigidly connecting the torsion bar 28 to the stub shaft 18. More specifically, the torsion bar 28 includes an outboard end 32 and an inboard end 34 with the outboard end 32 of the torsion bar 28 attached to the outboard end 22 of the stub shaft 18 and the inboard end 34 of the torsion bar 28 attached to the pinion head 24.

The proportional control valve 26 further includes a tubular valve body 36 having a pair of first rings 38 thereon for supporting the valve body 36 on the stub shaft 18 and for rotating independently of the stub shaft 18. A second pin 40 connects the valve body 36 to the pinion head 24 for rotating in unison. The proportional control valve 26 includes a valve spool 42 defined on the stub shaft 18 within the valve body 36. The valve spool 42 defines a plurality of arc-shaped slots 44 facing a plurality of internal grooves (not shown) in the valve body 36 and cooperates therewith to define a plurality of variable area throttling orifices (not shown). The valve body 36 defines a first annular groove 46, a second annular groove 48 and a third annual groove 50 being isolated from each other by seal rings (not numbered) slidably engaging a wall (not numbered) of the valve housing 16 with the second annular groove 48 disposed between the first and third annular grooves 46, 50. The first and third annular grooves 46, 50 are connected to opposite working chambers (not shown) of a steering assist fluid motor (not shown). The second annular groove 48 is connected to a pump (not shown).

The torsion bar 28 defines an open-center position of the valve spool 42 relative to the valve body 36 in which all of the throttling orifices are equally open and fluid circulates freely from the second annular groove 48 to a drain (not shown) coupled to a reservoir (not shown). When a user rotates the steering wheel (i.e. applies a manual effort), the torsion bar 28 twists within the stub shaft 18 (i.e. a torque is applied to the torsion bar 28) which causes the torsion bar 28 to move away from the open-center position. In other words, when the user rotates the steering wheel, one half of the throttling orifices become smaller and regulate a steering assist boost pressure in a corresponding one of the first and third annular grooves 46, 50 and one half of the throttling orifices become larger for unobstructed drainage of the fluid from the other one of the first and third annular grooves 46, 50 to the reservoir. The flow area of the smaller throttling orifices is proportional to the amount of twist between the outboard and inboard ends 32, 34 of the torsion bar 28. The torsion bar 28 resists this twisting and continuously seeks to rotate back to the open-center position, which is known in the art as a centering force. The user senses the torsion bar 28 resisting this twisting through the manual effort required to rotate the steering wheel.

The power steering assembly 10 further includes an electromagnetic mechanism 52 for varying the centering force of the torsion bar 28 to change a level of steering assist (i.e. the steering assist boost pressure) achieved when the steering wheel is rotated (i.e. manual effort is applied). The electromagnetic mechanism 52 includes an encapsulated annular exciting coil 54 rigidly attached to the valve housing 16. The electromagnetic mechanism 52 further includes an inner pole piece 56 disposed about the stub shaft 18 and an outer pole piece 58 coupled to and spaced from the inner pole piece 56. A second ring 60 rigidly couples the outer pole piece 58 to the inner pole piece 56. The inner and outer pole pieces 56, 58 will be discussed further below. Further details of the above discussed components are disclosed in U.S. Pat. No. 5,445,240, which is incorporated herein by reference in its entirety and assigned to the assignee of this invention.

Figure 2:
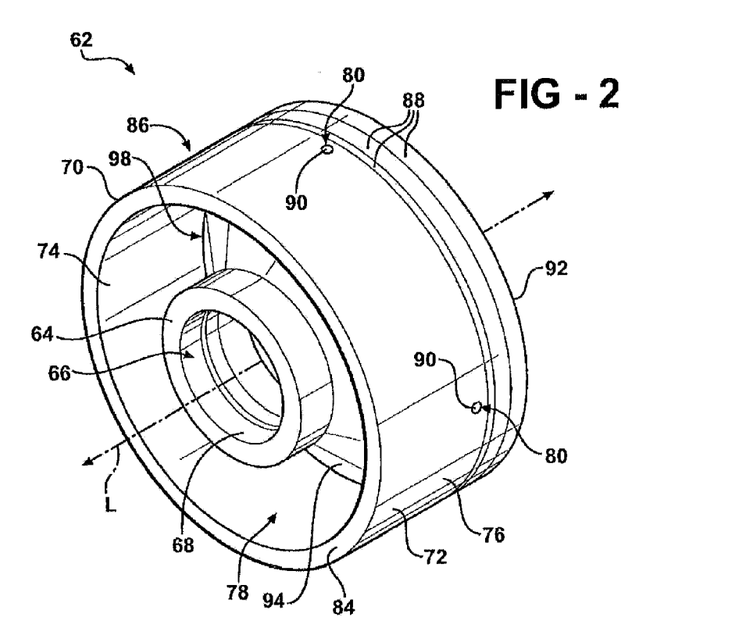
FIG. 2 is a perspective view of a magnet attached to a retaining hub.
Figure 3:
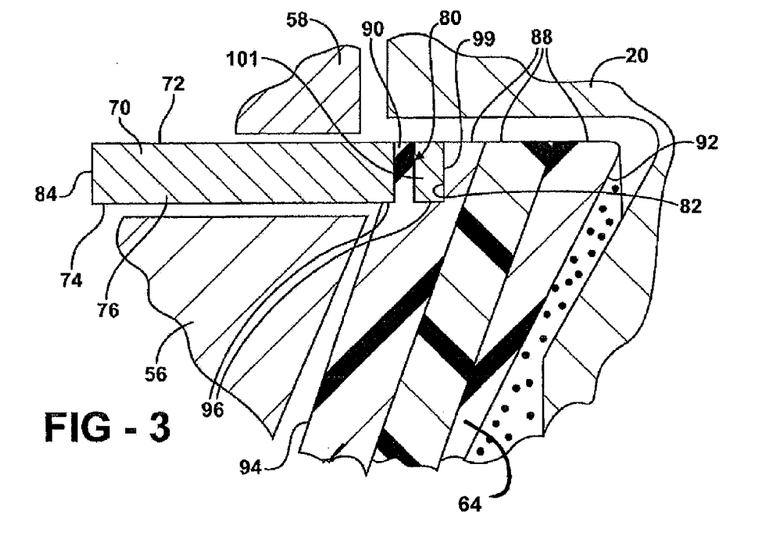
FIG. 3 is an enlarged broken cross-sectional view of the magnet defining an aperture with a section of the retaining hub disposed through the aperture for attaching the magnet to the retaining hub.

Also referring to FIGS. 2 and 3, the electromagnetic mechanism 52 includes a magnetic apparatus 62, typically used in the vehicle. It is to be appreciated that the magnetic apparatus 62 may be used in other applications outside of vehicles. The magnetic apparatus 62 includes a retaining hub 64 mounted to the stub shaft 18 within the valve housing 16. The retaining hub 64 defines a hollow 66 with the stub shaft 18 disposed through the hollow 66. More specifically, the retaining hub 64 includes an inner wall 68 defining the hollow 66 with the inner wall 68 mounted to the stub shaft 18. Further details of the retaining hub 64 are disclosed in U.S. Pat. No. 5,445,240, some of which will be discussed further below.

Figure 4:
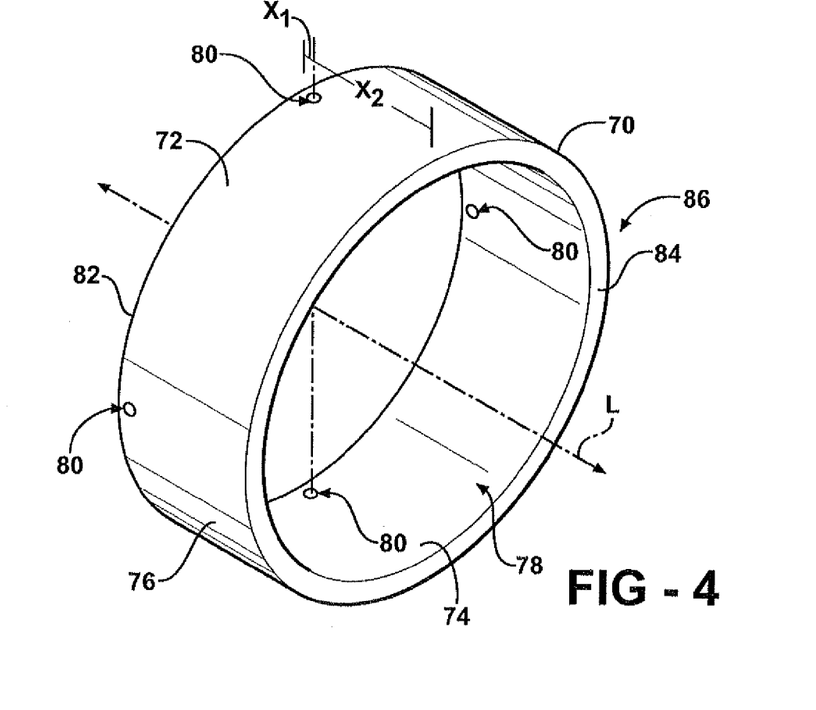
FIG. 4 is a perspective view of the magnet defining a plurality of apertures having a circular configuration.

The magnetic apparatus 62 further includes a magnet 70 attached to the retaining hub 64 and defining a longitudinal axis L with the hollow 66 of the retaining hub 64 disposed along the longitudinal axis L. As best shown in FIG. 4, the magnet 70 includes an outer surface 72 and an inner surface 74 opposing each other. More specifically, the magnet 70 includes a body portion 76 defining the longitudinal axis L and having the outer surface 72 and the inner surface 74 opposing each other. The inner surface 74 has a first portion and a second portion integrally connected to each other with the first portion facing the second portion in a spaced relationship relative to the longitudinal axis L.

The inner surface 74 defines an annular cavity 78 along the longitudinal axis L such that the magnet 70 defines a ring-shaped configuration, and more specifically, the body portion 76 defines the ring-shaped configuration. In other words, the outer and inner surfaces 72, 74 define a circular configuration such that the magnet 70 is further defined as a ring magnet 70. It is to be appreciated that the magnet 70 may be formed of any suitable configuration, such as a polygonal configuration, an oval configuration, an elliptical configuration, a square configuration, a rectangular configuration, a triangular configuration, a c-shaped configuration, etc. Further, the configuration of the magnet 70 may be formed by various methods, such as extrusion, molding, sintering, injection molding, compression molding, bonding or any other suitable method. Typically, the magnet 70 is formed of sintered powdered metal. It is to be appreciated that the retaining hub 64 and the magnet 70 may be used in applications other than vehicles and the power steering assembly 10 disclosed herein. For example, the retaining hub 64 and the magnet 70 may be used in a torque sensor or any other application with the magnet 70 attached to the retaining hub 64.

Also referring to FIGS. 1 and 3, the magnet 70 defines at least one aperture 80 disposed through the outer and inner surfaces 72, 74 transverse to the longitudinal axis L, and more specifically, the body portion 76 defines the at least one aperture 80 with the aperture 80 intersecting the annular cavity 78. In other words, the aperture 80 is disposed through the first portion and faces the second portion of the inner surface 74. The aperture 80 is formed through the outer and inner surfaces 72, 74 of the magnet 70 by utilizing a waterjet apparatus (not shown) which will be discussed further below. A section of the retaining hub 64 is disposed in the aperture 80 for attaching the retaining hub 64 to the magnet 70 such that the retaining hub 64 and the magnet 70 rotate in unison about the longitudinal axis L, and more specifically, such that the retaining hub 64 and the magnet 70 rotate in unison during rotation of the stub shaft 18. The aperture 80 and the section of the retaining hub 64 disposed in the aperture 80 provides radial and axial retention between the magnet 70 and the retaining hub 64 thus ensuring adequate attachment therebetween.

Figure 5:
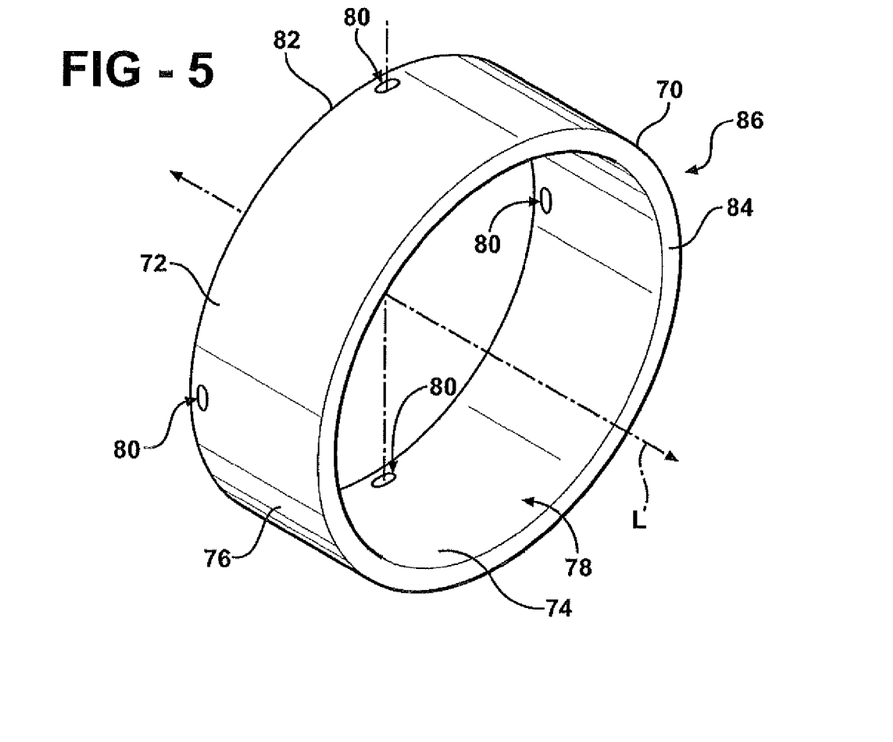
FIG. 5 is a perspective view of the apertures of the magnet having an elliptical configuration.

The at least one aperture 80 is further defined as a plurality of apertures 80 spaced from each other with the section of the retaining hub 64 disposed in each of the apertures 80. More specifically, a pair of the apertures 80 oppose each other in substantially a parallel relationship. In other words, one of the apertures 80 is disposed through the first portion and an other one of the apertures 80 is disposed through the second portion such that the apertures 80 align with each other relative to the longitudinal axis L. It is to be appreciated that any number of apertures 80 may be disposed through the magnet 70, the apertures 80 may be offset from each other, and/or the apertures 80 may be spaced any distance from each other. Typically, the apertures 80 extend through the outer and inner surfaces 72, 74 perpendicular to the longitudinal axis L. It is to be appreciated that the apertures 80 may extend through the outer and inner surfaces 72, 74 at other angles relative to the longitudinal axis L. In one embodiment as shown in FIG. 4, the apertures 80 define a circular configuration. It is to be appreciated that the apertures 80 may be defined as any other suitable configuration, such as a square configuration, a triangular configuration, a star configuration, and/or an elliptical configuration as shown in FIG. 5. It is to be further appreciated that one of the apertures 80 may be circular and an other one of the apertures 80 elliptical, etc.

Referring back to FIG. 4, the magnet 70 includes a first end wall 82 and a second end wall 84 spaced from each other and adjacent the outer and inner surfaces 72, 74 with the apertures 80 disposed between the first and second end walls 82, 84, and more specifically, the body portion 76 includes the first and second end walls 82, 84. Each of the apertures 80 are spaced a first distance $X_1$ from the first end wall 82 and each of the apertures 80 are spaced a second distance $X_2$ from the second end wall 84 such that the first distance $X_1$ is less than the second distance $X_2$. Specifically, each of the apertures 80 are disposed proximal to the first end wall 82 such that the retaining hub 64 is attached to the magnet 70 proximal to the first end wall 82. In other words, the apertures 80 are positioned such that the magnet 70 and the retaining hub 64 partially overlap each other relative to the longitudinal axis L. The apertures 80 are spaced the first distance $X_1$ from the first end wall 82 (proximal to the first end wall 82) for preventing damage to the magnet 70 during forming of the apertures 80. In other words, if the apertures 80 are formed too close to the first end wall 82, the magnet 70 may be damaged. It is to be appreciated that the apertures 80 may be disposed anywhere between the first and second end walls 82, 84, including when the first distance $X_1$ equals the second distance $X_2$ or when the apertures 80 are proximal the second end wall 84, etc.

The electromagnetic mechanism 52 further includes a magnetic article 86 defining the body portion 76 as discussed above. The body portion 76 is formed from a magnetic composition. Typically, the magnetic composition is commonly referred to in the art as a rare earth magnet. The rare earth magnet is a strong, permanent magnet that produces a magnetic field. The magnetic field of the rare earth magnet interacts with the exciting coil 54 and the inner and outer pole pieces 56, 58 which is discussed further below.

The magnetic composition comprises at least one lanthanoid, such as lanthanum, cerium, praseodymium, neodymium, promethium, samarium, europium, gadolinium, terbium, dysprosium, holmium, erbium, thulium, ytterbium, lutetium, and combinations thereof. In certain embodiments, the lanthanoid comprises neodymium. In other embodiments, the lanthanoid comprises samarium. It is to be appreciated that trace amounts of other lanthanoids may also be present in the magnetic composition, such as dysprosium, praseodymium, etc.

The magnetic composition further comprises at least one transition metal. In certain embodiments, the transition metal comprises iron. In other embodiments, the transition metal comprises cobalt. It is to be appreciated that trace amounts of other transition metals may also be present in the magnetic composition. In another embodiment, the magnetic composition further comprises at least one nonmetal, selected from the group of nonmetals of the periodic table. In one embodiment, the nonmetal comprises boron. It is to be appreciated that trace amounts of other nonmetals may also be present in the magnetic composition.

In certain embodiments, the magnetic composition has neodymium, iron, and boron which are commonly referred to in the art as a neodymium magnet. In a specific embodiment, the neodymium magnet comprises neodymium, iron, and boron, and optionally, trace amounts of other elements such as praseodymium, dysprosium, and cobalt. In other embodiments, the magnetic composition has samarium and cobalt which are commonly referred to in the art as a samarium-cobalt magnet. The samarium-cobalt magnet of these embodiments comprises samarium and cobalt, and optionally, trace amounts of other elements. Suitable neodymium magnets and samarium-cobalt magnets, for purposes of the present invention, are commercial available from Hitachi Metals America, Ltd. of Novi, Mich.; Shin-Etsu Magnetics of Glen Ellyn, Ill.; or Daido Steel of America, Inc. of Schaumburg, Ill.

Referring to FIGS. 1-3, the retaining hub 64 includes an outer periphery 88 spaced radially from the longitudinal axis L with the outer surface 72 of the magnet 70 substantially flush with the outer periphery 88 of the retaining hub 64. The section of the retaining hub 64 is further defined as a plurality of elongated projections 90 extending radially away from the longitudinal axis L with one of the elongated projections 90 disposed in each of the apertures 80. The elongated projections 90 and the apertures 80 provide an adequate way to attach the magnet 70 to the retaining hub 64 while maintaining such attachment during rotation of the retaining hub 64 and the magnet 70. In other words, the apertures 80 and the elongated projections 90 of the retaining hub 64 disposed in the aperture 80 provide radial and axial retention between the magnet 70 and the retaining hub 64 thus ensuring adequate attachment therebetween.

The retaining hub 64 includes a front side 92 and a back side 94 spaced from each other along the longitudinal axis L with the apertures 80 disposed between the front and back side 92, 94. The back side 94 includes a first shoulder 96 abutting the inner surface 74 of the magnet 70 with the elongated projections 90 extending outwardly from the first shoulder 96. The first shoulder 96 supports the elongated projections 90 and aids in the strength of attachment between the magnet 70 and the retaining hub 64. The back side 94 of the retaining hub 64 extends between the stub shaft 18 and the inner surface 74 of the magnet 70 to define a recess 98 between the back side 94 and the inner surface 74 with the inner pole piece 56 partially disposed in the recess 98. The apertures 80 are disposed proximal to the first end wall 82 to create the recess 98 between the magnet 70 and the retaining hub 64 for receiving the inner pole piece 56.

The retaining hub 64 also includes a second shoulder 99 adjacent the first shoulder 96 with the magnet 70 abutting the second shoulder 99 adjacent the inner surface 74. More specifically, the outer periphery 88 of the retaining hub 64 includes the second shoulder 99 extending transverse to the first shoulder 96 with the second shoulder 99 abutting the first end wall 82 of the magnet 70. The elongated projections 90 extend outwardly away from the first shoulder 96 with the elongated projections 90 spaced from the second shoulder 99 such that a part 101 of the magnet 70 is secured to the retaining hub 64 between the elongated projections 90 and the second shoulder 99. In other words, the retaining hub 64 surrounds the part 101 of the magnet 70 for aiding in the strength of attachment between the magnet 70 and the retaining hub 64 and for adequately securing the magnet 70 to the retaining hub 64. It is to be appreciated that the retaining hub 64 may completely or partially surround the part 101 of the magnet 70. For example, the outer surface 72 of the magnet 70 may fail to have the retaining hub 64 disposed thereon.

The retaining hub 64 is typically formed of plastic. It is to be appreciated that any other suitable material may be used to form the retaining hub 64. A mold cavity (not shown) is utilized to form the retaining hub 64 by injection molding the plastic in the mold cavity with the apertures 80 proximal to the first end wall 82 of the magnet 70 exposed to the plastic. In other words, the plastic is injected into the mold cavity and through the apertures 80 from the inner surface 74 toward the outer surface 72 thus creating the elongated projections 90 disposed in the apertures 80 which secures the magnet 70 to the retaining hub 64. When the plastic cures, the magnet 70 is attached to the retaining hub 64 and any excess plastic disposed on the outer surface 72 of the magnet 70 is trimmed for preventing interference with other components of the assembly 10, such as preventing interference with the outer pole piece 58 and/or the cover 20. It is to be appreciated that the plastic may be injected through the apertures 80 from the outer surface 72 toward the inner surface 74 to create the elongated projections 90 disposed in the apertures 80.

The stub shaft 18 is disposed through the annular cavity 78 and disposed along the longitudinal axis L. The stub shaft 18 is also spaced from the inner surface 74 of the magnet 70 and rotatable about the longitudinal axis L with the torsion bar 28 disposed along the longitudinal axis L. The magnet 70 is disposed between the inner and outer pole pieces 56, 58. In other words, the inner surface 74 of the magnet 70 faces the inner pole piece 56 and the outer surface 72 of the magnet 70 faces the outer pole piece 58 with the inner pole piece 56 partially disposed in the annular cavity 78. Since the retaining hub 64 is mounted to the stub shaft 18 and the magnet 70 is mounted to the retaining hub 64, the stub shaft 18, the retaining hub 64 and the magnet 70 rotate in unison when the stub shaft 18 rotates about the longitudinal axis L in response to the user rotating the steering wheel. The magnet 70 rotates between the inner and outer pole pieces 56, 58 during rotation of the stub shaft 18 about the longitudinal axis L. The interaction between the magnet 70, the inner and outer pole pieces 56, 58 and the exciting coil 54 creates magnetic flux. In other words, the magnetic flux created by energizing the exciting coil 54 is concentrated by the inner and outer pole pieces 56, 58 and interacts with the magnet 70 to induce a force between the pinion head 24 and the stub shaft 18. Depending on a direction of current flowing in the exciting coil 54 and a direction of the manual effort applied to the steering wheel by the user, the force induced between the pinion head 24 and the stub shaft 18 either increases or decreases the centering force of the torsion bar 28, thus changing the level of steering assist.

The apertures 80 of the magnet 70 are formed by utilizing the waterjet apparatus as mentioned above. More specifically, the waterjet apparatus utilizes a fluid (not shown) having an abrasive material (not shown) mixed therewith, which is commonly referred to as abrasive waterjet machining. The fluid may be further defined as water, oil, air, abrasive material and/or any other suitable fluid for forming the apertures. Typically the fluid is a combination of water and the abrasive material.

Figure 6:
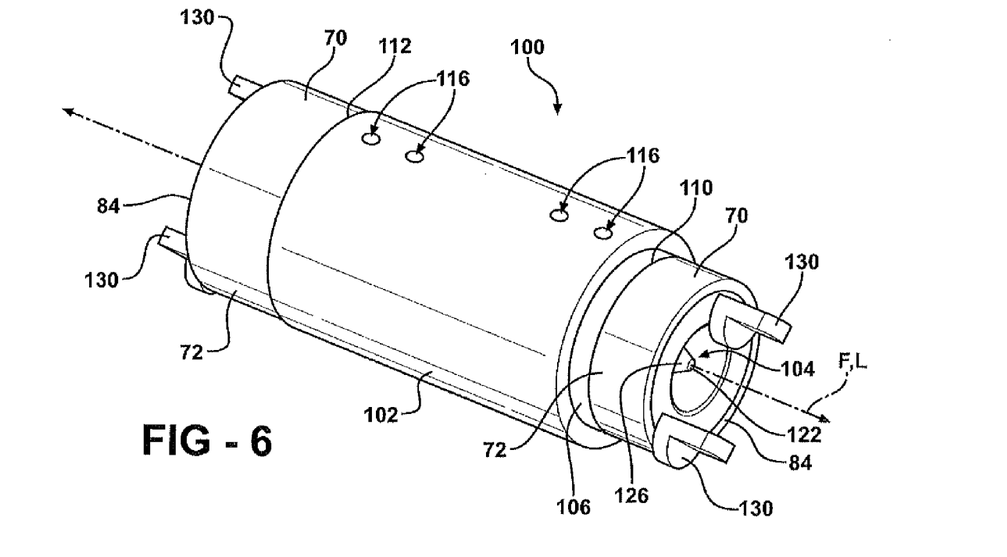
FIG. 6 is a perspective view of a fixture assembly having one magnet attached to a first attachment segment and another magnet attached to a second attachment segment.
Figure 7:
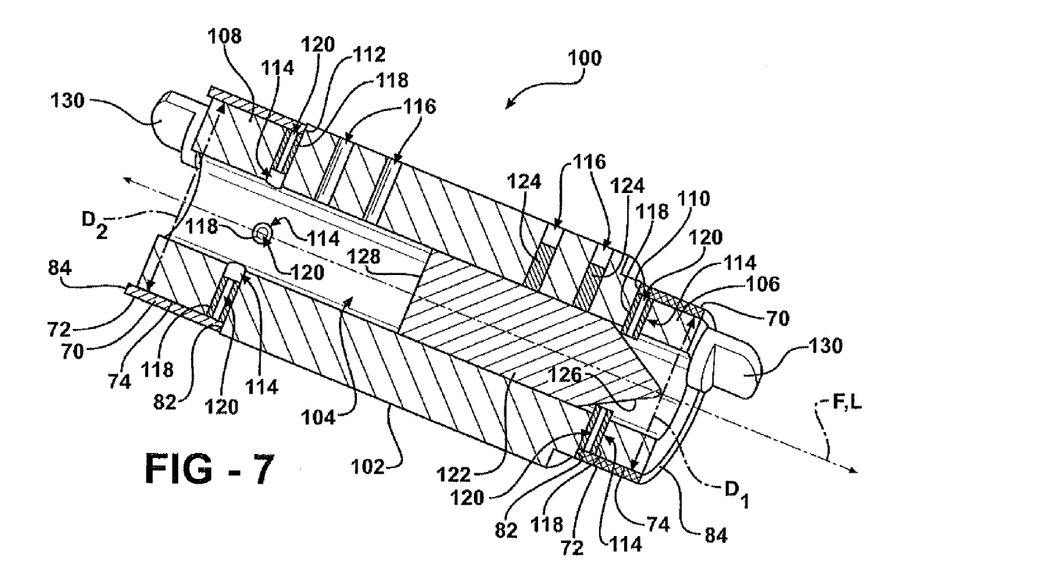
FIG. 7 is a cross-sectional view of the fixture assembly having a deflector disposed along a fixture axis.

Magnets 70, such as rare earth magnets, are very brittle and susceptible cracking or damage, thus a fixture assembly 100 has been developed that cooperates with the waterjet apparatus to form the apertures 80 through the magnet 70 without cracking or damaging the magnet 70 during production of the apertures 80. Referring to FIGS. 6 and 7, the fixture assembly 100 supports the magnet 70 when the waterjet apparatus flows the fluid through the magnet 70 to form the apertures 80. The fixture assembly 100 includes a fixture body 102 defining a fixture axis F and a hole 104 along the fixture axis F.

The fixture body 102 includes a first attachment segment 106 and a second attachment segment 108 with the hole 104 also disposed through the first and second attachment segments 106, 108. The first and second attachment segments 106, 108 extend outwardly away from the fixture body 102 along the fixture axis F. In other words, the first and second attachment segments 106, 108 are spaced from each other such that the fixture body 102 is disposed between the first and second attachment segments 106, 108. It is to be appreciated that the first and second attachment segments 106, 108 may be of any suitable configuration complementary to the magnet 70 configuration.

The first attachment segment 106 defines an outer diameter $D_1$ and the second attachment segment 108 defines an outer diameter $D_2$. The outer diameter $D_2$ of the second attachment segment 108 is larger than the outer diameter $D_1$ of the first attachment segment 106 such that different sized magnets 70 may be formed with the apertures 80. In other words, the fixture assembly 100 has the ability to form apertures 80 in magnets 70 having different diameters, thicknesses, widths and/or lengths. The inner surface 74 of the magnet 70 abuts one of the first and second attachment segments 106, 108 when forming the apertures 80. In other words, the first and second attachment segments 106, 108 support the magnet 70 for aiding in the prevention of cracking or damaging of the magnet 70. It is to be appreciated that when the magnet 70 is installed on one of the first and second attachment segments 106, 108, the longitudinal axis L of the magnet 70 aligns with the fixture axis F of the fixture body 102.

The fixture body 102 defines a first abutment 110 adjacent the first attachment segment 106 and a second abutment 112 adjacent the second attachment segment 108 with the first end wall 82 of the magnet 70 abutting one of the first and second abutments 110, 112 when installed on one of the first and second attachment segments 106, 108. The fixture body 102 defines a plurality of passages 114 transverse to the fixture axis F and intersect the hole 104. More specifically, the first and second attachment segments 106, 108 define the passages 114 adjacent the first and second abutments 110, 112, respectively with the passages 114 spaced from each other about the fixture axis F. It is to be appreciated that a pair of the passages 114 may oppose each other in substantially a parallel relationship, any number of passages 114 may be disposed through the first and second attachment segments 106, 108, the passages 114 may be offset from each other, and/or the passages 114 may be spaced any distance from each other.

The fixture body 102 further defines a plurality of bores 116 transverse to the fixture axis F and intersecting the hole 104. At least one of the bores 116 are disposed proximal the first attachment segment 106 and an other one of the bores 116 are disposed proximal the second attachment segment 108. More specifically, more than one of the bores 116 are disposed proximal to each of the first and second attachment segments 106, 108. The bores 116 may be spaced and parallel each other or the bores 116 may be disposed anywhere along the fixture body 102.

The fixture assembly 100 further includes a plurality of bushings 118 each defining a void 120 extending through the bushing 118 transverse to the fixture axis F for flowing the fluid through the void 120 and into the hole 104. One of the bushings 118 is disposed in each of the passages 114 for preventing damage to the fixture body 102 when the fluid flows through the void 120, and more specifically, to prevent damage to the first and second attachment segments 106, 108. One end (not numbered) of each of the bushings 118 are disposed flush with the outer diameter $D_1$ of the first attachment segment 106 and an other end (not numbered) of each of the bushings 118 protrude into the hole 104 of the first attachment segment 106. In addition, one end (not numbered) of each of the bushings 118 are disposed flush with the outer diameter $D_2$ of the second attachment segment 108 and an other end (not numbered) of each of the bushings 118 may be recessed within the passages 114 or disposed flush with the hole 104 of the second attachment segment 108. It is to be appreciated that the position of the bushings 118 relative to the hole 104 depends on the size of the bushings 118, the size of the hole 104, and/or the outer diameter $D_1$ of the first attachment segment 106 and the outer diameter $D_2$ of the second attachment segment 108.

The fixture assembly 100 also includes a deflector 122 disposed in the hole 104 and movable along the fixture axis F. Additionally, the fixture assembly 100 includes a plurality of posts 124 with one of the posts 124 disposed in each of the bores 116 for securing the deflector 122 within the hole 104. More specifically, the deflector 122 is movable along the fixture axis F within the hole 104 for properly positioning the deflector 122 relative to the passages 114 and the bushings 118. Fluid flows into the deflector 122 transverse to the fixture axis F and the deflector 122 redirects the fluid generally along the fixture axis F and out the hole 104. In other words, the deflector 122 intersects the fluid and directs the fluid away from the bushings 118 and out the hole 104.

The deflector 122 includes a deflecting end 126 and a flat end 128 spaced from each other along the fixture axis F. The deflecting end 126 defines a conical configuration for redirecting the fluid from transverse to the fixture axis F to generally along the fixture axis F and out the hole 104. It is to be appreciated that the deflecting end 126 of the deflector 122 may be any other suitable configuration for redirecting the fluid. It is to also be appreciated that more than one deflector 122 may be disposed in the hole 104 with the deflecting end 126 of each of the deflectors 122 facing away from each other.

The fixture assembly 100 includes a plurality of retainers 130 attached to the fixture body 102 and movable between a locked position and an unlocked position. More specifically, the retainers 130 are attached to each of the first and second attachment segments 106, 108. When the retainers 130 are in the unlocked position, the magnet 70 may be removed from or inserted on the fixture body 102, and more specifically removed from or inserted on one of the first and second attachment segments 106, 108. When the retainers 130 are in the locked position, the second end wall 84 of the magnet 70 abuts the retainers 130 and the first end wall 82 of the magnet 70 abuts one of the first and second abutments 110, 112 such that the magnet 70 is secured to the fixture body 102, and more specifically secured to one of the first and second attachment segments 106, 108 for providing accurate positioning of the magnet 70 relative to the passages 114 and for aiding in preventing damage to the magnet 70. As shown in FIG. 6, one of the retainers 130 attached to the first attachment segment 106 is in the unlocked position and an other one of the retainers 130 attached to the first attachment segment 106 is in the locked position. FIG. 7 shows the retainers 130 in the unlocked position. It is to be appreciated that the retainers 130 may be rotated between the locked and unlocked positions or the retainers 130 may be detached from and reattached to the fixture body 102 when moving between the unlocked and locked positions, respectively.

The present invention also provides a method of manufacturing the magnetic apparatus 62 having the magnet 70 utilizing the fluid and the fixture body 102 defining the hole 104 along the fixture axis F and the deflector 122 disposed within the hole 104. The method includes the steps of installing the magnet 70 on the fixture body 102 and securing the magnet 70 to the fixture body 102. The method further includes the steps of flowing the fluid through the magnet 70 transverse to the fixture axis F to form at least one aperture 80 and intersecting the fluid with the deflector 122 to redirect the fluid generally along the fixture axis F. More specifically, the step of flowing the fluid through the magnet 70 to form at least one aperture 80 is further defined as the step of flowing the fluid through the magnet 70 transverse to the fixture axis F to form the plurality of apertures 80 individually through the magnet 70. It is to be appreciated that the apertures 80 may be formed individually, in other words, formed one aperture 80 at a time or pairs of the apertures 80 may be formed simultaneously or all of the apertures 80 may be formed simultaneously.

The method also includes the step of moving the retainers 130 from the unlocked position to the locked position to secure the magnet 70 to the fixture body 102. The fixture body 102 defines the passages 114 transverse to the fixture axis F and further includes the step of flowing the fluid through the passages 114. More specifically, the step of flowing the fluid through the passages 114 is performed after flowing the fluid through the magnet 70 and the step of intersecting the fluid with the deflector 122 is performed after flowing the fluid through the passages 114. The method also includes the steps of positioning the deflector 122 within the hole 104 and securing the deflector 122 within the hole 104. The retaining hub 64 is formed to the apertures 80 of the magnet 70 to secure the magnet 70 to the retaining hub 64. More specifically, the elongated projections 90 flow through the apertures 80 and around the part 101 of the magnet 70 to secure the magnet 70 to the retaining hub 64. In other words, plastic is injected into the mold cavity and through the apertures 80 to form the elongated projections 90.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of manufacturing a magnetic apparatus including a magnet having an outer surface and an inner surface opposing each other with the inner surface having a first portion and a second portion integrally connected to each other with said first portion facing said second portion in a spaced relationship relative to a longitudinal axis, said magnet including a first end wall axially spaced from a second end wall along the longitudinal axis and adjacent said inner and outer surfaces and utilizing a fluid with a fixture body defining a hole along the longitudinal axis and a deflector disposed within the hole; said method comprising the steps of:

installing the magnet on the fixture body;
securing the magnet to the fixture body;
flowing the fluid through the magnet transverse to the longitudinal axis to form at least one aperture, said at least one aperture disposed between said first and second end walls and axially spaced from said first and second end walls along the longitudinal axis; and
intersecting the fluid with the deflector to redirect the fluid generally along the longitudinal axis.

2. A method as set forth in claim 1 wherein the fixture body defines a plurality of passages transverse to the longitudinal axis and further including the step of flowing the fluid through the passages.

3. A method as set forth in claim 2 wherein the step of flowing the fluid through the passages is performed after flowing the fluid through the magnet.

4. A method as set forth in claim 3 wherein the step of intersecting the fluid with the deflector is performed after flowing the fluid through the passages.

5. A method as set forth in claim 1 further including the step of positioning the deflector within the hole.

6. A method as set forth in claim 5 further including the step of securing the deflector within the hole.

7. A method as set forth in claim 1 wherein the step of flowing the fluid through the magnet to form at least one aperture is further defined as the step of flowing the fluid through the magnet transverse to the longitudinal axis to form a plurality of apertures individually through the magnet.

8. A method as set forth in claim 7 further including a retaining hub and further including the step of forming the retaining hub to the apertures of the magnet to secure the magnet to the retaining hub.

9. A magnetic apparatus comprising:
a retaining hub;
a magnet attached to said retaining hub and defining a longitudinal axis with said magnet having an outer surface and an inner surface opposing each other with said inner surface having a portion and a second portion integrally connected to each other with said first portion facing said second portion in a spaced relationship relative to said longitudinal axis, said magnet including a first end wall axially spaced from a second end wall along said longitudinal axis and adjacent said inner and outer surfaces; and
said magnet defining at least one aperture disposed through said inner and outer surfaces transverse to said longitudinal axis, said at least one aperture disposed between said first and second end walls and axially spaced from said first and second end walls along said longitudinal axis, with a section of said retaining hub disposed in said aperture for attaching said retaining hub to said magnet such that said retaining hub and said magnet rotate in unison about said longitudinal axis.

10. An apparatus as set forth in claim 9 wherein said at least one aperture is further defined as a plurality of apertures spaced from each other with said section of said retaining hub disposed in each of said apertures.

11. An apparatus as set forth in claim 10 wherein said section of said retaining hub is further defined as a plurality of elongated projections extending radially away from said longitudinal axis with one of said elongated projections disposed in each of said apertures.

12. An apparatus as set forth in claim 11 wherein said retaining hub includes a front side and a back side spaced from each other along said longitudinal axis with said apertures disposed between said front and back side.

13. An apparatus as set forth in claim 12 wherein said back side includes a first shoulder abutting said inner surface of said magnet with said elongated projections extending outwardly from said first shoulder.

14. An apparatus as set forth in claim 13 wherein said retaining hub includes a second shoulder adjacent said first shoulder with said magnet abutting said second shoulder adjacent said inner surface.

15. An apparatus as set forth in claim 10 wherein one of said apertures is disposed through said first portion and an other one of said apertures is disposed through said second portion such that said apertures align with each other relative to said longitudinal axis.

16. An apparatus as set forth in claim 10 wherein said apertures are further defined as a circular configuration.

17. An apparatus as set forth in claim 10 wherein said apertures are further defined as an elliptical configuration.

18. An apparatus as set forth in claim 9 wherein each of said apertures are spaced a first distance from said first end wall.

19. An apparatus as set forth in claim 9 wherein said aperture is disposed through said first portion and faces said second portion of said inner surface.

20. An apparatus as set forth in claim 9 wherein said inner surface of said magnet defines an annular cavity along said longitudinal axis such that said magnet defines a ring-shaped configuration.

21. A magnetic apparatus comprising:
a retaining hub;
a magnet attached to said retaining hub and defining a longitudinal axis with said magnet having an outer surface and an inner surface opposing each other with said inner surface having a first portion and a second portion integrally connected to each other with said first portion facing said second portion in a spaced relationship relative to said longitudinal axis and said magnet defining a plurality of apertures disposed through said inner and outer surfaces transverse to said longitudinal axis with a section of said retaining hub disposed in each of said apertures for attaching said retaining hub to said magnet such that said retaining hub and said magnet rotate in unison about said longitudinal axis, said plurality of apertures spaced from each other, said magnet including a first end wall and a second end wall spaced from each other and adjacent said inner and outer surfaces with said apertures disposed between said first and second end walls, and each of said apertures being spaced a first distance from said first end wall and spaced a second distance from said second end wall such that said first distance is less than said second distance.

* * * * *